(12) United States Patent
Akaike et al.

(10) Patent No.: US 11,015,249 B2
(45) Date of Patent: May 25, 2021

(54) SILVER-COATED SILICONE RUBBER PARTICLES, CONDUCTIVE PASTE CONTAINING SAME, AND A CONDUCTIVE FILM PRODUCTION METHOD USING CONDUCTIVE PASTE

(71) Applicant: MITSUBISHI MATERIALS CORPORATION, Tokyo (JP)

(72) Inventors: Hiroto Akaike, Naka (JP); Kazuhiko Yamasaki, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/478,193

(22) PCT Filed: Jan. 16, 2018

(86) PCT No.: PCT/JP2018/000913
§ 371 (c)(1),
(2) Date: Jul. 16, 2019

(87) PCT Pub. No.: WO2018/135458
PCT Pub. Date: Jul. 26, 2018

(65) Prior Publication Data
US 2019/0368047 A1  Dec. 5, 2019

(30) Foreign Application Priority Data
Jan. 17, 2017  (JP) .............................. JP2017-005542

(51) Int. Cl.
| *H01B 1/22* | (2006.01) |
| *C23C 18/08* | (2006.01) |
| *C23C 18/16* | (2006.01) |
| *C08K 3/36* | (2006.01) |
| *C08L 83/04* | (2006.01) |
| *H01B 5/14* | (2006.01) |

(52) U.S. Cl.
CPC ............ *C23C 18/1641* (2013.01); *C08K 3/36* (2013.01); *C08L 83/04* (2013.01); *C23C 18/1651* (2013.01); *H01B 1/22* (2013.01); *H01B 5/14* (2013.01); *C08L 2203/16* (2013.01)

(58) Field of Classification Search
CPC ... H01B 1/00; H01B 1/02; H01B 1/22; C09D 5/24; B05D 5/12; C23C 18/08
See application file for complete search history.

(56) References Cited

U.S. PATENT DOCUMENTS

| 5,538,793 | A | * | 7/1996 | Inokuchi | .................. C08J 3/124 428/407 |
| 10,573,425 | B2 | * | 2/2020 | Akaike | .................. C09D 11/52 |
| 10,590,540 | B2 | * | 3/2020 | Akaike | .................. C23C 18/166 |
| 2016/0304728 | A1 | | 10/2016 | Kageyama | |
| 2017/0358384 | A1 | * | 12/2017 | Kageyama | .......... C23C 18/1658 |

FOREIGN PATENT DOCUMENTS

| EP | 2325261 A1 | | 5/2011 |
| JP | 2002-133948 A | | 5/2002 |
| JP | 2002133948 | * | 5/2002 |
| JP | 2004-238588 A | | 8/2004 |
| JP | 2016-130354 A | | 7/2016 |
| JP | 2017147163 A | * | 8/2017 |
| WO | 2009/035906 A2 | | 3/2009 |

OTHER PUBLICATIONS

International Preliminary Report on Patentability dated Jul. 23, 2019, issued for PCT/JP2018/000913.
International Search Report dated Apr. 10, 2018, issued for PCT/JP2018/000913.
Office Action issued in corresponding Japanese Patent Application No. JP 2017-005542,21, dated May 2020.
Notice of Reasons for Refusal (Office Action) issued in corresponding Japanese Patent Application No. JP 2017-005542, dated Sep. 8, 2020.
Extended European Search Report issued in corresponding European Patent Application No. EP18741626.8, dated Sep. 23, 2020.

* cited by examiner

*Primary Examiner* — Mark Kopec
(74) *Attorney, Agent, or Firm* — Locke Lord LLP; James E. Armstrong, IV; Nicholas J. DiCeglie, Jr.

(57) ABSTRACT

The silver-coated silicone rubber particles according to the present invention are each formed by providing a first coating layer comprising silicon or a silicon compound on the surface of a silicone rubber particle and further providing a second coating layer comprising silver on the surface of the first coating layer. In a conductive paste containing the silver-coated silicone rubber particles, the silver-coated silicone rubber particles are dispersed evenly.

12 Claims, No Drawings

SILVER-COATED SILICONE RUBBER PARTICLES, CONDUCTIVE PASTE CONTAINING SAME, AND A CONDUCTIVE FILM PRODUCTION METHOD USING CONDUCTIVE PASTE

TECHNICAL FIELD

The present invention relates to silver-coated silicone rubber particles suitable as a conductive filler or conductive particles contained in a conductive adhesive, a conductive film, or a conductive spacer, a conductive paste containing the silver-coated silicone rubber particles, and a method of producing a conductive film with the conductive paste. By the way, the present international application claims priority based on Japanese Patent Application No. 5542 (JP No. 2017-5542) filed on Jan. 17, 2017, all content of JP No. 2017-5542 are incorporated by reference.

BACKGROUND ART

So far, conductive silicone rubber particles formed by a physical vapor deposition method, in which a precious metal-coated layer of 10 to 80 mass. % relative to a total of precious metal-coated silicone rubber particles after deposition treatment is formed on a surface of silicone rubber particles having an average particle size of 0.1 to 100 μm are disclosed (See, for example, Patent Document 1.). In these conductive silicone rubber particles, a precious metal-coated layer is formed by the sputtering method.

In the conductive silicone rubber particles thus constituted, by adopting the physical deposition such as the sputtering as a coating method, due to precious metal atoms excited to a high energy state by plasma, an adhered precious metal coating layer may be formed on a surface of the silicone rubber particles so far difficult to plate. Accordingly, the conductive silicone rubber particles of the present invention have excellent flexibility and elasticity and excellent conductivity that the silicone rubber intrinsically has.

PRIOR ART REFERENCES

Patent Document

[Patent Document 1] JP 2004-238588 A (Claim 1, Claim 2, paragraph [0036])

SUMMARY OF INVENTION

Problem to be Solved by the Invention

However, in the conductive silicone rubber particles shown in the conventional Patent Document 1, the silicone rubber particles used as base particles flocculate very easily by itself. Also the conductive silicone rubber particles obtained by coating the silicone rubber particles with a precious metal flocculate from a part where an unstable silicone rubber surface is exposed during coating, there was a defect that when the precious metal crosslinks the base particles each other, the secondary particle size increased. Then, when the secondary particle size increased, in the case where the conductive silicone rubber particles are used as conductive fillers in the conductive paste, an operation load in a kneading step increases and the precious metal coating is peeled to cause a problem such as deterioration of the conductivity or a problem such that the conductive silicone rubber particles become difficult to be applied to the conductive spacer required to have high dispersibility.

An object of the present invention is to provide silver-coated silicone rubber particles capable of suppressing flocculation of the silver-coated silicone rubber particles and a conductive paste containing the particles and a production method of a conductive film using the conductive paste.

Means for Solving the Problem

A first viewpoint of the present invention relates to silver-coated silicone rubber particles in which on a surface of the silicone rubber particles, a first coating layer made of silicon or a silicon compound is provided, and a second coating layer made of silver is provided on a surface of the first coating layer.

A second viewpoint of the present invention relates to a conductive paste containing the silver-coated silicone rubber particles according to the first viewpoint.

A third viewpoint of the present invention relates to a method of producing a conductive film using the conductive paste according to the second viewpoint.

Effect of the Invention

In the silver-coated silicone rubber particles of the first viewpoint of the present invention, since a first coating layer made of silicon or a silicon compound is provided on a surface of the silicone rubber particles, the flocculation of the silicone rubber particles coated with the first coating layer is suppressed, and, since the second coating layer made of silver is provided on a surface of the first coating layer, the flocculation of the silver-coated silicone rubber particles may be suppressed from. As the result, the silver-coated silicone rubber particles have excellent conductivity, and since an operation load in the kneading step when using as a conductive filler in a conductive paste is not increased, the silver-coated silicone rubber particles are suitable as the conductive filler or the conductive particles of the conductive adhesive, the conductive film, the conductive rubber and the conductive spacer. By the way, although the silicone rubber particles have an unstable surface state and readily flocculate, when coating the surface of the silicone rubber particles with silicon or the silicon compound, due to high affinity with the silicone rubber particles, without damaging an adhesive force between a coated layer and a silicone rubber particle surface, the surface of the silicone rubber particles is stabilized, and the flocculation of the silicone rubber particles is suppressed. Thus, since a situation that the silver crosslinks the silicone rubber particles (base particles) with each other to increase the secondary particle size is not generated, when the conductive silicone rubber particles are used as the conductive filler in the conductive paste, without increasing an operation load in the kneading step, and the silver-coated film (the second coated layer made of silver) is not peeled, without inviting the deterioration of the conductivity, furthermore, the conductive silicone rubber particles may be applied to the conductive spacer required to have high dispersibility.

Since the conductive paste according to the second viewpoint of the present invention is a conductive paste containing the silver-coated silicone rubber particles, the silver-coated silicone rubber particles without increased secondary particle size are excellent in the dispersibility, that is, the silver-coated silicone rubber particles are uniformly dispersed in the conductive paste. As the result, since the conductive paste has excellent conductivity and does not increase the operation load in the kneading step when used as the conductive filler in the conductive paste, it is suitable for preparation of a conductive adhesive, a conductive film and a conductive spacer.

In a production method of a conductive film according to a third viewpoint of the present invention, a conductive film is produced by means of the conductive paste, so the silver-coated silicone rubber particles without increased secondary particle size are excellent in the dispersibility, that is, the silver-coated silicone rubber particles are uniformly dispersed in the conductive paste. As the result, since a state where the silver-coated silicone rubber particles are uniformly dispersed in the conductive film is maintained, the conductive film has excellent conductivity.

DESCRIPTION OF THE PREFERRED EMBODIMENTS

Next, an embodiment for carrying out the present invention will be described. Silver-coated silicone rubber particles are constituted by providing a first coating layer made of silicon or a silicon compound on a surface of silicone rubber particles and by providing a second coating layer made of silver on a surface of the first coating layer. That is, the silver-coated silicone rubber particles include the first coating layer made of silicon or a silicon compound provided on a surface of silicone rubber particles, and a second coating layer made of silver provided on a surface of the first coating layer.

An average particle size of the silver-coated silicone rubber particles is measured based on a SEM image (scanning electron microscope image) and is preferable to be 0.5 to 60 μm. Furthermore, it is preferable that the silver is contained in the range of 2 to 90 pts·mass relative to 100 pts·mass of the silver-coated silicone particles. Here, a reason why a preferable range of the average particle size of the silver-coated silicone rubber particles measured based on the SEM image is in the range of 0.5 to 60 μm is that when smaller than 0.5 μm, the silver-coated silicone rubber particles tend to cause re-flocculation, and when exceeding 60 μm, there is tendency to be difficult to apply as a fine wiring or a conductive filler of a thin film material. Furthermore, a reason why a preferable content ratio of the silver relative to 100 pts·mass of the silver-coated silicone rubber particles is in the range of 2 to 90 pts·mass is that when less than 2 pts·mass, the conductivity tends to be damaged, and exceeding 90 pts·mass, a thickness of the silver-coated layer relative to a particle size of the silicone rubber particles that are base particles becomes relatively large, the flexibility of the silicone rubber particles tends to be damaged. Furthermore, the silicon or the silicon compound that constitutes the first coating layer is preferable to be any one of silica, silicate glass, silicon or silicone resin.

On the other hand, a thickness of the first coating layer is preferably 5 to 3050 nm. However, the first coating layer does not necessarily completely cover the surface of the first coating layer, for example, a form where a particulate substance covers sparsely a surface of the silicone rubber particles may be applicable. Furthermore, a thickness of the second coating layer is preferably 30 to 3000 nm. Here, a reason why a preferable thickness of the first coating layer is in the range of 5 to 3050 nm is that in the range of smaller than 5 nm, a flocculation suppression effect of the silicone rubber particles due to the first coating layer may not be sufficiently obtained, and in the range of exceeding 3050 nm, the flexibility of the silicone rubber particles tend to be damaged due to the hardness of the first coating layer.

Furthermore, a reason why a preferable thickness of the second coating layer is in the range of 30 to 3000 nm is that when smaller than 30 nm, the hardness of the second coating layer decreases to tend to cause crack or defect, and when exceeding 3000 nm, the flexibility of the silicone rubber particles tend to be damaged due to the hardness of the second coating layer. By the way, the thicknesses of the first coating layer and second coating layer were measured based on SEM images (scanning electron microscope image) of cross-sections of the silver-coated silicone rubber particles. Specifically, the thickness of the first coating layer or second coating layer of one silver-coated silicone rubber particle was measured at optional ten points respectively by using a distance measurement between two points in software "PC-SEM", and an average value thereof is calculated. At this time, the thickness of the first coating layer indicates a distance from a contact point of an outer periphery part of a silicon rubber particle to a contact point of an outer periphery part of the first coating layer on a line segment vertical to a tangential line drawn on the outer periphery part of the silicone rubber particle. Furthermore, the thickness of the second coating layer indicates a distance from a contact point of an outer periphery part of the first coating layer to a contact point of an outer periphery part of the second coating layer on a line segment vertical to a tangential line drawn on the outer periphery part of the first coating layer. The measurement and calculation are applied to 100 silver-coated silicone rubber particles and average values thereof are calculated. The value was taken as a thickness of a first coating layer or a second coating layer. Furthermore, the situation where the first coating layer contains the silicon or the silicon compound may be confirmed by the following method. The silver-coated layer of the silver-coated silicon rubber particle is dissolved with dilute nitric acid of 1 to 20% to expose the first coating layer or the first coating layer and silicone rubber particle. When the first coating layer is analyzed by means of AES (auger electron spectroscopy) or TOF-SIMS (time of flight type secondary ion mass spectrometry), whether the silicon or the silicon compound is contained may be evaluated.

A production method of the silver-coated silicone rubber particles constituted like this will be described. First, a surface of silicone rubber particles is coated with a first coating layer made of silicon or a silicon compound.

(1) A Case where the First Coating Layer is Silica

First, silicone rubber particles that are base particles are surface modified by an atmospheric plasma device for powder. Then, the surface-modified silicone rubber particles are dipped in ion exchange water added with a surfactant, followed by irradiating ultrasonic to prepare a dispersion. Furthermore, ethanol and ethyl orthosilicate are added to the dispersion and stirred, followed by dropping nitric acid to the dispersion to hydrolyze ethyl orthosilicate. Thus, a first coating layer made of silica is provided on a surface of the silicone rubber particles. By the way, by adhering silica particles having an average particle size of about 5 nm t 5 μm such as molten silica powder or wet silica powder on a surface of the silicone rubber particles by means of a kneader such as a composite mixer, the first coating layer may be provided.

(2) A Case where the First Coating Layer is Silicate Glass

In the same manner as in the (1) except that during hydrolysis, a metal salt or a boron compound is added to precipitate a coating layer as silicate glass, a first coating layer is provided on a surface of the silicone rubber particles. By the way, by adhering fine silicate glass particles to a surface of the silicone rubber particles by means of a composite kneader to cover the surface of the silicone rubber particles, the first coating layer may be formed. Here, the first coating layer becomes not silica but silicate glass because the first coating layer contains metal salts such as a sodium salt, a potassium salt, a barium salt or a magnesium salt, boron, and boron compounds such as boric acid.

(3) A Case where the First Coating Layer is Silicon

By means of a composite kneader, fine silicon particles are attached on a surface of the silicone rubber particles to coat the surface of the silicone particles with silicone, whereby a first coating layer can be formed.

(4) A Case where the First Coating Layer is Silicone Resin

First, silicone rubber particles of which surface was activated by plasma irradiation are dispersed in water with a surfactant or the like. To the dispersion, organo-trialkoxysilane and an acidic solution or an alkaline solution are added to hydrolyze/condensate to be able to coat a silicone resin on a surface of the silicone rubber particles. Here, the organo-trialkoxysilane is represented by a general formula: $RSi(OR^1)_3$, wherein the R is an organic group containing at least one of an alkyl group, a phenyl group, an epoxy group, a mercapto group, an amino group or a vinyl group and $R^1$ is a straight chain or branched chain alkyl group selected from a methyl group, an ethyl group, a propyl group, a butyl group or a pentyl group. As specific organo-trialkoxysilane, methyl trimethoxysilane, methyl triethoxysilane, methyl-tripropoxysilane, methyl-tributylsilane, methyl-tripentoxysilane, ethyl-trimethoxysilane, propyl-trimethoxysilane, vinyl-trimethoxysilane, or phenyl-trimethoxysilane may be used. Furthermore, as the acidic solution or alkaline solution used in the hydrolysis, any one of an aqueous solution of an organic substance and an aqueous solution of an inorganic substance may be used. As the organic acid, carboxylic acid such as formic acid, acetic acid may be used, and as the inorganic acid, hydrochloric acid, sulfuric acid, nitric acid, phosphoric acid or a dilute aqueous solution thereof may be used. Furthermore, as the organic alkaline solution, amine compounds such as ethanol amine, methyl amine, ethyl amine are used, and as the inorganic alkaline solution, ammonia water, an aqueous solution of sodium hydroxide, and an aqueous solution of potassium hydroxide are used. Furthermore, commercial silicone rubber particles coated with a silicone resin may be also used.

Next, on a surface of the first coating layer of the silicone rubber particles with the first coating layer and on a surface of the exposed silicone rubber particles, which were prepared according to the methods of the (1) to (4), a second coating layer made of silver is provided. In general, when the electroless plating is applied on a surface of a nonconductor such as an organic material or an inorganic material, it is necessary to apply a catalytic treatment on a surface of the nonconductor in advance. In the present embodiment, as the catalytic treatment, a treatment of providing a tin adsorption layer on a surface of the first coating layer and on a surface of exposed silicone rubber particles is performed, after that, an electroless silver plating treatment is performed to provide the second coating layer made of silver. Specifically, the second coating layer made of silver of the present embodiment is provided on a surface of the first coating layer and exposed silicone rubber particles in such a manner that the silicone rubber particles with the first coating layer are added to an aqueous solution of a tin compound heated at 25 to 45° C. to form a tin adsorption layer on a surface of the first coating layer and on a surface of the exposed silicone rubber particles, followed by applying the electroless silver plating on the tin adsorption layer with a reducing agent.

In order to form the tin adsorption layer, the silicone rubber particles with the first coating layer are added in an aqueous solution of a tin compound and stirred, followed by filtering the silicone rubber particles with the first coating layer and washing with water. A stirring time is appropriately determined according to a temperature of an aqueous solution of the following tin compound and a content of the tin compound but is preferably 0.5 to 24 hours. The temperature of the aqueous solution of the tin compound is preferably 25 to 45° C. When the temperature of the aqueous solution of the tin compound is lower than 25° C., the temperature is too low and the activity of the aqueous solution becomes low, and the tin compound cannot sufficiently attach on the surface of the first coating layer of the silicone rubber particles and on the exposed surface of the silicone rubber particles. On the other hand, when the temperature of the aqueous solution of the tin compound exceeds 45° C., the tin compound is oxidized, and the aqueous solution becomes unstable, and the tin compound does not sufficiently attach on the surface of the first coating layer of the silicone rubber particles and on the surface of the exposed silicone rubber particles. When the treatment is performed in an aqueous solution of 25 to 45° C., divalent ion of tin attaches on a surface of the first coating layer that coats the silicone rubber particles and on a surface of the exposed silicone rubber particles to form a tin adsorption layer.

As the tin compound, stannous chloride, stannous fluoride, stannous bromide, and stannous iodide may be used. A content of tin in an aqueous solution when the tin compound is used is preferably 20 $g/dm^3$ or larger, and may be contained in the aqueous solution until a saturating concentration is obtained. By the way, in order to enhance the solubility of the tin compound, 0.8 $cm^3$ or more of hydrochloric acid is preferably contained relative to 1 g of tin in the aqueous solution.

After the tin adsorption layer was formed on the surface of the first coating layer that coats the silicone rubber particles and the surface of the exposed silicone rubber particles, a reducing agent is applied to the tin adsorption layer to carry out the electroless silver plating to form the second coating layer made of silver on the surface of the first coating layer and on the surface of the exposed silicone rubber particles to obtain silver-coated silicon rubber particles. As the electroless plating method, (1) a method where, in an aqueous solution containing a complexing agent, a reducing agent or the like, the silicone rubber particles with the first coating layer on a surface of which a tin adsorption layer was formed are dipped, and an aqueous solution of a silver salt is dropped, (2) a method where, in an aqueous solution containing a silver salt, and a complexing, the silicone rubber particles with the first coating layer on a surface of which the tin adsorption layer was formed are dipped, and an aqueous solution of a reducing agent is dropped, and (3) a method where, in an aqueous solution containing the silver salt, the complexing agent, the reducing agent, or the like, the silicone rubber particles with the first coating layer on a surface of which a tin adsorption layer was formed are dipped, and an aqueous solution of a caustic alkali is dropped may be used.

As the silver salt, silver nitrate or one obtained by dissolving silver in nitric acid may be used. As the complexing agent, ammonia, ethylene diamine tetra-acetic acid, tetra-sodium ethylene diamine tetra-acetate, nitro triacetic acid, triethylene tetramine hexaacetate, sodium thiosulfate, succinate, succinic amide, citrate or iodide salt may be used. As the reducing agent, formalin, glucose, imidazole, Rochelle salt (sodium potassium tartrate), hydrazine and its derivative, hydroquinone, L-ascorbic acid or formic acid may be used. As the reducing agent, due to the strength of a reducing force, from aldehyde is preferable, a mixture of two or more kinds containing at least formaldehyde is more preferable, and a mixture of reducing agents containing formaldehyde and glucose is most preferable.

In the electroless silver plating process, first, a substitution reaction between tin and silver ion of the tin adsorption layer starts to precipitate metallic silver that becomes a nucleus on the surface of the first coating layer that coats the silicone rubber particles. Due to the substitution reaction and an autocatalytic reduction reaction, on the surface of the first coating layer that coats the silicone rubber particles, a second coating layer of silver having a predetermined crystallite diameter is formed, thus silver-coated silicone rubber particles are obtained.

In the silver-coated silicone rubber particles thus produced, since the first coating layer made of the silicon or the silicon compound on the surface of the silicone rubber particles, the silicone rubber particles coated with the first coating layer may be suppressed from flocculating, and since the second coating layer made of silver is provided on the surface of the first coating layer, the silver-coated silicone rubber particles in the silver coating process may be suppressed from flocculating. As the result, the silver-coated silicone rubber particles have excellent conductivity, do not increase an operation load in the kneading step when used as the conductive filler in a conductive paste, and are preferable as a conductive filler or conductive particles of a conductive adhesive, a conductive filler and a conductive spacer.

The conductive paste includes the silver-coated silicone rubber particles as the conductive filler. Furthermore, the conductive paste contains at least one kind of an epoxy resin, a phenolic resin, a urethane resin, a polyimide resin or a silicone resin as a binder resin, and, as needs arise, a curing agent and a solvent.

(Ratio of Silver-Coated Resin Particles in Conductive Paste)

A ratio of the silver-coated silicone rubber particles contained in the conductive paste is preferably set to a ratio of 70 to 90 pts·mass in 100 pts·mass of the conductive paste and more preferably set to a ratio of 75 to 85 pts·mass. In the case of smaller than 70 pts·mass, a resistance value of an electrode or a wiring formed by coating and curing the conductive paste increases to be difficult to form the electrode or wiring excellent in the conductivity. On the other hand, in the case of exceeding 90 pts·mass, since there is a tendency that a paste having excellent fluidity is difficult to obtain, from the viewpoint of printing property, it is difficult to form excellent electrode or the like.

(Binder Resin in Conductive Paste)

As the epoxy resin as the binder resin contained in the conductive paste, an epoxy resin of, for example, a bisphenol type, a biphenyl type, a biphenyl mixture type, a naphthalene type, a cresol-novolak type, a dicyclopentadiene type, a trisphenol ethane type, and a tetraphenol ethane type may be used.

As the curing agent of the epoxy resin, latent curing agents such as generally used imidazoles, Lewis acids containing tertiary amines or boron fluoride, or its compounds, a phenol-based curing agent, an acid anhydride-based curing agent, and dicyandiamide are preferably used. As the imidazoles, 2-methyl imidazole, 2-ethyl-4-methyl imidazole, 2-phenylimidazole, 2-phenyl-4-methyl imidazole, 2-phenyl-4, 5-dihydroxy methyl imidazole, 2-phenyl-4-methyl-5-hydroxy methyl imidazole, and 2-phenyl imidazole isocyanuric acid adduct may be used, as the tertiary amines, piperidine, benzyl amine, diethyl amino propylamine, isophorone diamine, and diamino diphenyl methane may be used. Furthermore, as the Lewis acid containing boron fluoride, amine complex of boron fluoride such as boron fluoride monoethyl amine may be used, and, as the phenol-based curing agent, a phenol novolak resin, a para-xylylene phenol resin, a dicyclopentadiene phenol resin may be used. Furthermore, as the acid anhydride-based curing agent, phthalic anhydride, terahydro phthalic anhydride, and hexahydrophthalic anhydride may be used.

Furthermore, to the epoxy resin, as needs arise, a curing accelerator may be added. As the curing accelerator, imidazoles such as 1-benzyl-2-methyl imidazole and its salts, tertiary amine such as 1,8-diazabicyclo[5.4.0]undeca-7-ene and its salts, organic phophine compound such as triphenyl phosphine and its salts, organic metal salts such as zinc octylate, stannous octylate, and alkoxy titanium, and precious metals such as platinum and palladium may be used.

Although the phenol resin as the binder resin contained in the conductive paste may have any structure as long as it is a thermoset type, a molar ratio of formaldehyde/phenol is preferably in the range of 1 to 2. A weight average molecular weight of the thermoset type phenol resin is preferably 300 to 5000, and more preferably 1000 to 4000.

As the urethane resin as the binder resin contained in the conductive paste, generally used ones for an adhesive may be used. Specifically, a polyol-based urethane resin, a polyester-based urethane resin, a polycaprolactone-based urethane resin, a polyether-based urethane resin, a polycarbonate-based urethane resin, and a urethane acrylate resin may be used, and these may be used singularly or in a combination thereof. Furthermore, as needs arise, a curing agent such as an isocyanate or a block isocyanate may be added.

As the silicone resin as the binder resin contained in the conductive paste, as far as it is used generally for an adhesive, any structure of adduct type and condensed type may be used. As the specific silicone resin, various kinds of organopolysiloxanes, modified polysiloxanes, elastomer-modified polysiloxanes, room-temperature-curable silicone rubbers may be used, and these may be used singularly or in a combination thereof.

As the acrylic resin as the binder resin contained in the conductive paste, ones of a thermal set type, a photopolymerizable type, and a solvent vaporization type that are generally used may be used. For example, an acrylic-melamine resin, a methyl polyacrylate resin, an acryl-styrene copolymer, a silicone-modified acrylic resin, and an epoxy-modified acrylic resin may be used, and these may be used singularly or in a combination thereof. Furthermore, as needs arise, a thermoset agent such as isocyanate, or an alkylphenone-based photopolymerization initiator may be used as the curing agent.

As the polyimide resin as the binder resin contained in the conductive paste, generally used ones may be used. For example, aromatic polyimide, alicyclic polyimide, polyimide siloxane, epoxy-modified polyimide, and photosensitive polyimide may be used, and these may be used singularly or in a combination.

The epoxy resin, phenol resin, urethane resin, acrylic resin, silicone resin or polyimide resin described above may suppress the quality deterioration due to the temporal change of the conductive paste, and, at the same time, since a main chain has a rigid skeleton, and a cured material has excellent heat resistance and moisture resistance, the endurance of an electrode produced may be improved. A ratio of the binder resin in the conductive paste is desirably in the range of 25 to 75 vol. % in terms of a volume ratio in the cured material.

When the ratio of the binder resin is smaller than the lower limit value, a defect such as adhesive failure is generated, and when exceeding the upper limit value, a defect such as deterioration of the conductivity is caused.

(Diluent in Conductive Paste)

As the diluent, ether alcohol-based solvents such as ethylene glycol monoethyl ether, ethylene glycol monobutyl ether, propylene glycol monomethyl ether, propylene glycol monoethyl ether, propylene glycol mono-n-butyl ether, diethylene glycol monoethyl ether, diethylene glycol monobutyl ether, dipropylene glycol monomethyl ether, dipropylene glycol monobutyl ether, and tripropylene glycol monoethyl ether or acetate ester-based solvents thereof; aromatic hydrocarbon-based solvents such as ethylene glycol, propylene glycol, terpionel, mineral spirit, and toluene; aliphatic hydrocarbon-based solvents such as dodecane; dimethyl formamide, N-methyl-2-pyrrolhidone, dimethyl sulfoxide, diacetone alcohol, dimethyl acetamide, γ-butyrolactone, water, a reactive diluent may be used. These are selected based on the compatibility with the binder resin, and, in the silicone resin, mineral spirit or toluene is particularly preferable, in the polyimide resin, N-methyl-2-pyrrolidone, a phenol resin, and a urethane resin are particularly preferable, and in the epoxy resin, ethyl carbitol acetate, butyl carbitol acetate, and α-terpionel are particularly preferable. These solvents may be used singularly or in a combination of a plurality of kinds.

To the binder resins and mixtures thereof, within the range of not damaging the conductivity, thermal conductivity, adhesiveness, and a shape retaining property, an additive may be mixed. As the additive, a silane coupling agent, a titanium coupling agent, silver nano particles, a thickener, a dispersant, a flame retardant, a defoaming agent, or an antioxidant may be used.

The conductive paste has excellent conductivity and may be suitably used for preparation of a conductive membrane such as conductive film or a conductive spacer. In order to produce the conductive membrane like this, first, a conductive paste is preferably coated by a coating method such as a screen printing method to forma desired printed pattern. Then, after forming the printed pattern, followed by drying and firing at a desired temperature. Here, the firing is performed by using an equipment such as a circulating hot-air oven, by holding for 0.5 to 1 hour preferably at a temperature of 150 to 250° C.

EXAMPLES

Next, examples of the present invention will be described in detail together with a comparative example.

Example 1

First, as base particles, 10 g of silicone rubber particles having an average particle size of 10 μm was prepared, and the silicone rubber particles were surface-modified by means of an atmospheric plasma device for powder. Next, after dipping the surface-modified silicone rubber particles in 250 g of ion exchange water to which a surfactant was added, ultrasonic of 25 kHz was irradiated for 10 minutes to prepare a dispersion. Furthermore, to the dispersion, 550 g of ethanol and 5.0 g of ethyl orthosilicate were added, followed by stirring for 5 minutes, and 5 g of 1% nitric acid was dropped to hydrolyze the ethyl orthosilicate. Thus, a first coating layer made of silica was provided on a surface of the silicone rubber particle.

After the silicone rubber particles with the first coating layer were washed with water, on a surface of the first coating layer that coats the silicone rubber particles, by providing a second coating layer made of silver by the electroless plating, silver-coated silicone rubber particles were prepared such that a content ratio of the silver to 100 pts·mass of the silver-coated silicone rubber particles is 50 pts·mass. The electroless plating was performed as shown below. First, in 100 ml of water, 20 g of sodium ethylene diamine tetra-acetate as a complexing agent, 10.0 g of sodium hydroxide as a pH adjuster, and 8 ml of formalin (formaldehyde concentration: 37 mass %) as a reducing agent were added to dissolve these, an aqueous solution containing the complexing agent and the reducing agent was prepared. Then, in the aqueous solution, the water-washed silicone rubber particles with the first coating layer were dipped to prepare a slurry. Then, 16 g of silver nitrate, 18 ml of 25% ammonia water, and 30 ml of water were mixed to prepare a silver nitrate-containing aqueous solution, and, while stirring the slurry, the aqueous solution containing the silver nitrate was dropped. Furthermore, while dropping an aqueous solution of sodium hydroxide to the slurry after the silver nitrate-containing aqueous solution was dropped, by stirring while maintaining at a temperature of 25° C., the silver was deposited on the surface of the first coating layer. Then, after washing, filtering, and drying at a temperature of 60° C. by means of a vacuum dryer, blocked particles were loosened by means of a 325 mesh stainless plain woven wire gauze and a vibration sieve, and silver-coated silicone rubber particles were obtained. The silver-coated silicone rubber particles were taken as Example 1.

Example 2

Silver-coated silicone rubber particles were prepared in the same manner as in EXAMPLE 1 except that as the silicone rubber particles with the first coating layer, silicone rubber particles that were coated with silicate glass and are made of the base particles having an average particle size of 3 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 78 pts·mass. The silver-coated silicone rubber particles were taken as EXAMPLE 2. Furthermore, by kneading by means of the composite mixer, the silicone rubber particles were coated with silicate glass. Specifically, by mechanically kneading silicate glass powder for binder having an average particle size of 0.4 μm and the silicone rubber particles, the silicate glass powder was adhered on the surface of the silicone rubber particles, thus, the silicone rubber particles with the first coating layer were prepared.

Example 3

Silver-coated silicone rubber particles were prepared in the same manner as in EXAMPLE 1 except that as the silicone rubber particles with the first coating layer, silicone rubber particles that were coated with silicon and are made of the base particles having an average particle size of 30 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 40 pts·mass. The silver-coated silicone rubber particles are taken as EXAMPLE 3. Furthermore, by kneading by means of the composite mixer, the silicone rubber particles were coated with silicone. Specifically, by mechanically kneading silicon powder having an average particle size of 0.2 μm and the silicone rubber particles by the complex mixer to adhere the silicon powder on the surface of the silicone rubber particles, thus, the silicone rubber particles with a first coating layer were prepared.

Example 4

Silver-coated silicone rubber particles were prepared in the same manner as in EXAMPLE 1 except that as the silicone rubber particles with the first coating layer, silicone rubber particles that are coated with a silicone resin and are made of the base particles having an average particle size of 5 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver relative to 100 pts·mass of the silver-coated silicone rubber particles is 50 pts·mass. The silver-coated silicone rubber particles are taken as EXAMPLE 4. Furthermore, the silicone rubber particles coated with the silicone resin were prepared as shown below. First, plasma was irradiated to 100 pts·mass of the silicone rubber particles having an average particle size of 5 μm by means of an atmospheric plasma device for powder to activate the particle surface. Then, the silicone rubber particles were dispersed in 500 pts·mass of ion exchange water in which a surfactant was added, followed by adjusting a liquid temperature to 15° C. Next, to the dispersion, 11 pts·mass of methyl trimethoxysilane and 1 pt·mass of 10 mass % hydrochloric acid were added, followed by stirring for two hours to proceed hydrolysis/condensation. Furthermore, the obtained suspension was washed, filtered and dried to obtain the silicone rubber particles coated with the silicone resin.

Example 5

Silver-coated silicone rubber particles were prepared in the same manner as in EXAMPLE 1 except that as the silicone rubber particles with the first coating layer, silicone rubber particles that are coated with silica particles and are made of the base material having an average particle size of 2 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 82 pts·mass. The silver-coated silicone rubber particles are taken as EXAMPLE 5. Furthermore, by kneading by means of the composite mixer, the silicone rubber particles were coated with silicate glass. Specifically, by mechanically kneading fumed silica particles having an average particle size of 50 nm and the silicone rubber particles to adhere the silica powder on the surface of the silicone rubber particles, thus, the silicone rubber particles with the first coating layer were prepared.

Example 6

Silver-coated silicone rubber particles were prepared in the same manner as in EXAMPLE 1 except that as the silicone rubber particles with the first coating layer, silicone rubber particles that were coated with silica particles and are made of the base particles having an average particle size of 0.4 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 90 pts·mass. The silver-coated silicone rubber particles are taken as EXAMPLE 6. Furthermore, the coating of silica that is the first coating layer to the silicone rubber that are base particles was performed in the same manner as EXAMPLE 1.

Example 7

Silver-coated silicone rubber particles were prepared in the same manner as in EXAMPLE 1 except that as the silicone rubber particles with the first coating layer, the silicone rubber particles that were coated with silica particles and are made of the base particles having an average particle size of 60 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 2 pts·mass. The silver-coated silicone rubber particles are taken as EXAMPLE 7. Furthermore, the coating of silica that is the first coating layer to the silicone rubber that are base particles was performed in the same manner as in EXAMPLE 1 except that an amount of used ethyl orthosilicate was set to 0.3 g and an amount of used 1% nitric acid was set to 0.5 g.

Example 8

Silver-coated silicone rubber particles were prepared in the same manner as in EXAMPLE 1 except that as the silicone rubber particles with the first coating layer, the silicone rubber particles that were coated with silicate glass and are made of the base particles having an average particle size of 40 μm were used, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 70 pts·mass. The silver-coated silicone rubber particles are taken as EXAMPLE 8. Furthermore, the coating of silica that is the first coating layer to the silicone rubber that are base particles was performed in the same manner as in EXAMPLE 2 except that as the silicate glass powder, silicate glass powder having an average particle size of 3.1 μm was used.

Comparative Example 1

Silver-coated silicone rubber particles were prepared in the same manner as in Example 1, except that without coating the surface of the silicone rubber particles with the first coating layer, but by directly coating the surface of the silicone rubber particles with the second coating layer, and while maintaining a mass ratio of substances contained at a constant mass ratio, in each of the aqueous solution containing the complexing agent and reducing agent used when coating the second layer and the aqueous solution containing silver nitrate, a mass used was adjusted such that a content ratio of the silver to 100 pts·mass of the silver-coated silicone rubber particles is 65 pts·mass. The silver-coated silicone rubber particles were taken as COMPARATIVE EXAMPLE 1.

(Comparison Test 1 and Evaluation)

An average particle size of each of the silver-coated silicone rubber particles of EXAMPLES 1 to 8 and COMPARATIVE EXAMPLE 1 was measured to evaluate an agglomeration degree. Specifically, first, an average particle size a of the silver-coated silicone rubber particles was measured by SEM observation. Then, an average particle size b of the silver-coated silicone rubber particles was measured by means of a laser diffraction particle distribution meter.

(A) Measurement of Average Particle Size a by SEM Observation

The prepared silver-coated silicone rubber particles were observed with a scanning electron microscope (SE-43005 manufactured by Hitachi Technologies) at a magnification expressed by the following formula (1).

$$Y = 10,000/x \quad (1)$$

In the above formula (1), Y denotes an observation magnification (times), and x (μm) denotes an average particle size of the silicone rubber particles (base particles). For example, in Example 1, since the base particles having an average particle size of 10 μm were used, and x of the above formula (1) is 10, Y=10,000/10=1,000 times was used to observe. Of one kind of the silver-coated silicone rubber particles, 100 images were taken for each of different observation places, by analyzing with software "PC SEM", an average particle size of the silver-coated silicone rubber particles was obtained. The particle size obtained by the image analysis is a particle size of a primary particle based on a contour of the silver-coated silicone rubber particle derived from the base particle and a film thickness of coated silver. This is taken as the average particle size a.

(B) Measurement of Average Particle Size b Due to Laser Diffraction Particle Size Distribution Measurement Meter First, 0.1 g of the silver-coated silicone rubber particles was immersed in 20 g of a 0.5% aqueous solution of sodium hexametaphosphate, and ultrasonic of 25 kHz was irradiated for 5 minutes to prepare a dispersion. Next, an appropriate amount of the dispersion was dropped in an observation cell of a laser diffraction particle size distribution measurement meter (LA-960 manufactured by Horiba Ltd.), and according to a procedure of the equipment, a particle size distribution was measured to obtain an average particle size of the silver-coated silicone rubber particles. The particle size obtained by the measurement is a particle size of secondary particle that treats also a flocculated particle as one particle. This was taken as an average particle size b.

(C) Calculation of Agglomeration Degree b/a

From the average particle size a obtained by the (A) and the average particle size b obtained by the (B), an agglomeration degree b/a was calculated.

Then, one of which agglomeration degree b/a is smaller than 2.50 was treated as good, and one of which agglomeration degree b/a is 2.50 or larger was treated as defect.

Results thereof are shown in Table 1. By the way, why a threshold value of the agglomeration degree b/a was set to 2.50 is due to the following reason. When assumed that the silver-coated silicone rubber particles are used as the conductive filler of the conductive paste, during kneading with a three-roll mill, usually, a gap between rolls is set to be about 2.5 to 5 times the average particle size a. Therefore, when the agglomeration degree b/a becomes 2.50 or larger, a problem that a silver coating film of a crosslinked part is peeled by disintegration due to the three-roll mill, as the result, the conductivity of the conductive paste is deteriorated is remarkably generated. Furthermore, in Table 1, thicknesses of the first coating layer and second coating layer of the silver-coated silicone rubber particles, and the content ratio of the silver were also described. The thicknesses of the first coating layer and second coating layer were measured based on SEM images (scanning electron microscope image) of cross-section of the silver-coated silicone rubber particle. Specifically, the thickness of the first coating layer or second coating layer of one silver-coated silicone rubber particle was measured at optional ten points respectively by using a distance measurement between two points in software "PC-SEM", and an average value thereof was calculated. At this time, the thickness of the first coating layer indicates a distance from a contact point on an outer periphery part of the silicon rubber particle to a contact point on an outer periphery part of the first coating layer on a line segment vertical to a tangential line drawn along the outer periphery part of the silicone rubber particle. Furthermore, the thickness of the second coating layer indicates a distance from a contact point on an outer periphery part of the first coating layer to a contact point on an outer periphery part of the second coating layer on a line segment vertical to a tangential line drawn along the outer periphery part of the first coating layer. The measurement and calculation were applied to 100 silver-coated silicone rubber particles and average values thereof were calculated.

TABLE 1

| | Silver-coated silicone rubber particle | | | | |
|---|---|---|---|---|---|
| | Average particle size of base particles (μm) | First coating layer | | Content ratio of silver (mass %) | Thickness of second coating layer (nm) |
| | | Kind | Thickness (nm) | | |
| Example 1 | 10 | Silica | 150 | 50 | 210 |
| Example 2 | 3 | Silicate glass | 490 | 78 | 240 |
| Example 3 | 30 | Silicon | 180 | 40 | 254 |
| Example 4 | 5 | Silicone resin | 30 | 70 | 170 |
| Example 5 | 2 | Silica | 45 | 82 | 132 |
| Example 6 | 0.4 | Silica | 10 | 90 | 70 |
| Example 7 | 60 | Silica | 5 | 2 | 30 |
| Example 8 | 40 | Silicate glass | 3050 | 70 | 3000 |
| Comparative example 1 | 5 | None | — | 65 | 170 |

TABLE 1-continued

| | Silver-coated silicone rubber particle | | | |
|---|---|---|---|---|
| | Average particle size a (μm) | Average particle size b (μm) | b/a | Evaluation |
| Example 1 | 11.0 | 12.3 | 1.12 | Good |
| Example 2 | 4.7 | 10.6 | 2.27 | Good |
| Example 3 | 32.0 | 37.8 | 1.18 | Good |
| Example 4 | 5.9 | 9.6 | 1.63 | Good |
| Example 5 | 2.5 | 5.1 | 2.04 | Good |
| Example 6 | 0.5 | 1.1 | 2.20 | Good |
| Example 7 | 60 | 148.8 | 2.48 | Good |
| Example 8 | 51.8 | 82.2 | 1.59 | Good |
| Comparative example 1 | 5.6 | 28.3 | 5.05 | Bad |

As obvious from Table 1, in comparative example 1 where the surface of the silicone rubber particles do not have the first coating layer made of the silicon or the silicon compound, the degree of agglomeration b/a becomes such a high value as 5.05, the secondary particle size of the silver-coated silicone rubber particles increased. On the other hand, in examples 1 to 8 where the surface of the silicone rubber particles has the first coating layer made of the silicon or the silicon compound, due to the agglomeration suppression effect of the first coating layer, the degree of agglomeration b/a becomes 2.48 or smaller, thus, the silver-coated silicone rubber particles having excellent dispersibility were obtained.

INDUSTRIAL APPLICABILITY

The silver-coated silicone rubber particles of the present invention may be utilized as the conductive filler or conductive particles of the conductive adhesive, conductive film and conductive spacer.

The invention claimed is:

1. Silver-coated silicone rubber particles comprising:
   a first coating layer made of either one of silica, silicon, or silicate glass provided on a surface of the silicone rubber particles; and
   a second coating layer made of silver provided on a surface of the first coating layer.

2. A conductive paste comprising the silver-coated silicone rubber particles according to claim 1.

3. A method of producing a conductive film using the conductive paste according to claim 2.

4. The silver-coated silicone rubber particles according to claim 1, wherein the silica is formed from ethyl ortho silicate, or by adhering silica particles on a surface of the silicone rubber particles.

5. A conductive paste comprising the silver-coated silicone rubber particles according to claim 4.

6. A method of producing a conductive film using the conductive paste according to claim 5.

7. A method of producing a conductive film using the conductive paste according to claim 5.

8. The silver-coated silicone rubber particles according to claim 1, wherein the silicon is silicon particles adhered to a surface of the silicone rubber particles.

9. A conductive paste comprising the silver-coated silicone rubber particles according to claim 8.

10. The silver-coated silicone rubber particles according to claim 1, wherein the silicate glass is formed from ethyl orthosilicate, or by adhering silicate glass particles on a surface of the silicone rubber particles.

11. A conductive paste comprising the silver-coated silicone rubber particles according to claim 10.

12. A method of producing a conductive film using the conductive paste according to claim 11.

* * * * *